(12) United States Patent
Atkins et al.

(10) Patent No.: US 12,452,450 B2
(45) Date of Patent: Oct. 21, 2025

(54) DYNAMIC SPATIAL METADATA FOR IMAGE AND VIDEO PROCESSING

(71) Applicant: Dolby Laboratories Licensing Corporation, San Francisco, CA (US)

(72) Inventors: Robin Atkins, Vancouver (CA); Per Jonas Andreas Klittmark, Mountain View, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 18/694,635

(22) PCT Filed: Sep. 20, 2022

(86) PCT No.: PCT/US2022/044115
§ 371 (c)(1),
(2) Date: Mar. 22, 2024

(87) PCT Pub. No.: WO2023/055612
PCT Pub. Date: Apr. 6, 2023

(65) Prior Publication Data
US 2024/0397088 A1   Nov. 28, 2024

Related U.S. Application Data

(60) Provisional application No. 63/250,407, filed on Sep. 30, 2021.

(30) Foreign Application Priority Data

Nov. 17, 2021   (EP) .................................... 21208718

(51) Int. Cl.
*H04N 19/00*   (2014.01)
*G06T 5/30*   (2006.01)
(Continued)

(52) U.S. Cl.
CPC ............... *H04N 19/59* (2014.11); *G06T 5/30* (2013.01); *H04N 19/117* (2014.11); *H04N 19/167* (2014.11)

(58) Field of Classification Search
CPC .... H04N 19/59; H04N 19/117; H04N 19/167; H04N 19/17; H04N 19/463; G06T 5/30
See application file for complete search history.

(56) References Cited

U.S. PATENT DOCUMENTS 8,593,480 B1    11/2013   Ballestad
9,961,237 B2    5/2018    Atkins
(Continued)

FOREIGN PATENT DOCUMENTS

JP    2021520741 A    8/2021
WO    2017116952 A1   7/2017
(Continued)

OTHER PUBLICATIONS

ITU-R BT. 2100-2 (Jul. 2018) Image Parameter Values for High Dynamic Range Television for Use in Production and International Programme Exchange, International Telecommunication Union (ITU), Geneva, 16 pgs.

(Continued)

*Primary Examiner* — Frank F Huang

(57) ABSTRACT

Methods and systems for generating and using dynamic spatial metadata in image and video processing are described. In an encoder, in addition to global metadata, local, spatial metadata for two or more image regions or image objects are generated, smoothed, and embedded as spatial metadata values. In a decoder, the decoder can reconstruct the spatial metadata and use interpolation techniques to generate metadata for specific regions of interest. Examples of generating spatial metadata related to min, mid, and max luminance values in an image are provided.

20 Claims, 3 Drawing Sheets

(51) Int. Cl.
  *H04N 19/117*  (2014.01)
  *H04N 19/167*  (2014.01)
  *H04N 19/59*   (2014.01)

(56) References Cited

U.S. PATENT DOCUMENTS

| | | | |
|---|---|---|---|
| 10,397,666 | B2 | 8/2019 | Thomas |
| 10,600,166 | B2 | 3/2020 | Pytlarz |
| 10,721,530 | B2 | 7/2020 | Van Brandenburg |
| 10,977,764 | B2 | 4/2021 | Kunkel |
| 11,122,290 | B2* | 9/2021 | Jang .................... H04N 19/182 |
| 2016/0381398 | A1 | 12/2016 | Saxena |
| 2018/0109817 | A1 | 4/2018 | Wang |
| 2018/0115776 | A1 | 4/2018 | Holcomb |
| 2018/0332289 | A1* | 11/2018 | Huang .................. H04N 19/96 |
| 2019/0320189 | A1 | 10/2019 | Cooper |
| 2019/0349587 | A1* | 11/2019 | Jang ...................... H04N 19/13 |
| 2019/0387241 | A1* | 12/2019 | Kim ..................... H04N 19/147 |
| 2020/0014961 | A1 | 1/2020 | Ramaswamy |
| 2020/0068195 | A1* | 2/2020 | Yoo ..................... H04N 19/117 |
| 2020/0177901 | A1* | 6/2020 | Choi .................... H04N 19/122 |
| 2020/0177921 | A1* | 6/2020 | Koo ....................... H04N 19/61 |
| 2020/0234499 | A1 | 7/2020 | Hwang |
| 2020/0311945 | A1 | 10/2020 | Lim |
| 2020/0374531 | A1* | 11/2020 | Zhao ................... H04N 19/119 |
| 2020/0374535 | A1 | 11/2020 | Makeev |
| 2020/0382574 | A1* | 12/2020 | Ouedraogo |
| 2021/0014534 | A1* | 1/2021 | Koo .................... H04N 19/129 |
| 2021/0144376 | A1* | 5/2021 | Tsukuba ............... H04N 19/139 |
| 2021/0211723 | A1 | 7/2021 | Wang |
| 2021/0211729 | A1* | 7/2021 | Koo ....................... H04N 19/18 |
| 2021/0218996 | A1* | 7/2021 | Koo .................... H04N 19/176 |
| 2022/0303542 | A1* | 9/2022 | Paluri ................. H04N 19/186 |

FOREIGN PATENT DOCUMENTS

| | | |
|---|---|---|
| WO | 2020192084 A1 | 10/2020 |
| WO | 20200219341 A1 | 10/2020 |

OTHER PUBLICATIONS

Khiem, N., et al., Supporting Zoomable Video Streams with Dynamic Region-of-Interest Cropping, MMSys '10: Proceedings of the first annual Acm Sigmm conference on Multimedia systems, Feb. 2010, (https://dl.acm.org/doi/10.1145/1730836.1730868), pp. 259-270, 12 pgs.

Zadeh, H., et al., OMAF: View-dependent 360-degree HDR video rendering based on ROI image statistics, 118. MPEG Meeting, Apr. 2017, Hobart, Australia (Motion Picture Expert Group or ISO/IEC JTC1/SC29/WG11), No. m40534, Mar. 29, 2017, XP030068879, 6 pgs.

* cited by examiner

DYNAMIC SPATIAL METADATA FOR IMAGE AND VIDEO PROCESSING

CROSS-REFERENCE TO RELATED APPLICATIONS

This application is a U.S. National Stage application under U.S.C. 371 of International Application No. PCT/US2022/044115, filed on 20 Sep. 2022, which claims priority of the following priority applications: U.S. Provisional Application No. 63/250,407, filed 30 Sep. 2021, and European Patent Application No. 21208718.3, filed 17 Nov. 2021, the contents of each of which are hereby incorporated in its entirety.

TECHNOLOGY

The present invention relates generally to images. More particularly, an embodiment of the present invention relates to generating and applying dynamic spatial metadata in image and video processing.

BACKGROUND

Content creation, such as the creation of movies, TV shows, or animations, and content capture, such as the recording of live sports events or news events, or even recording a personal clip with a mobile phone, is characterized by multiple factors, including pixel resolution, aspect ratio (16:9, 9:16, 4:3, and the like), and dynamic range (e.g., standard dynamic range, high dynamic range, HDR10, etc.). Once the content is created or captured, it is then distributed for playback on devices that can have many different aspect ratios, resolutions, and dynamic ranges. All such playback devices will then be required to adapt the display of content by performing a variety of operations, including: up-sampling, down-sampling, cropping or padding the content to match the resolution and aspect ratio of a target display, and/or display mapping to map the incoming dynamic range of the content to the dynamic range of the target display. Users may also manipulate the incoming video or images to their own preferences, for example, by rotating the screen, cropping, zooming, and the like.

As used herein, the terms "display management" or "display mapping" refer to processes that are performed on a receiver to render a picture for a target display. For example, and without limitation, such processes may include tone-mapping, gamut-mapping, color management, frame-rate conversion, and the like.

In most cases, the transmitted content is also accompanied by metadata.

As used herein, the term "metadata" relates to any auxiliary information that is transmitted as part of a coded bitstream or still images and assists a decoder to render a decoded image. Such metadata may be "static," that is, metadata that remain unchanged in the video bitstream or in a set of captured images. Typically, static metadata characterize the main monitor and/or environment used to create the video (say, dynamic range and color gamut of a reference display, ambient light during content creation, color gamut of the bitstream, encoding of the bitstream (e.g., using gamma, HLG, or PQ coding for the video (Ref. [5]), and the like). Some metadata may be "dynamic," that is, it may change on a per picture, frame, or scene basis within the video stream or the set of captured still images, such as minimum, average, and maximum luminance values in an image, colorist trim parameters, regions of interest, tone-mapping parameters, reshaping parameters, and the like. Image metadata play an important role in the accurate processing and display of incoming content. To improve existing image processing and display schemes, as appreciated by the inventors here, improved techniques for the generation of dynamic image metadata are developed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1:
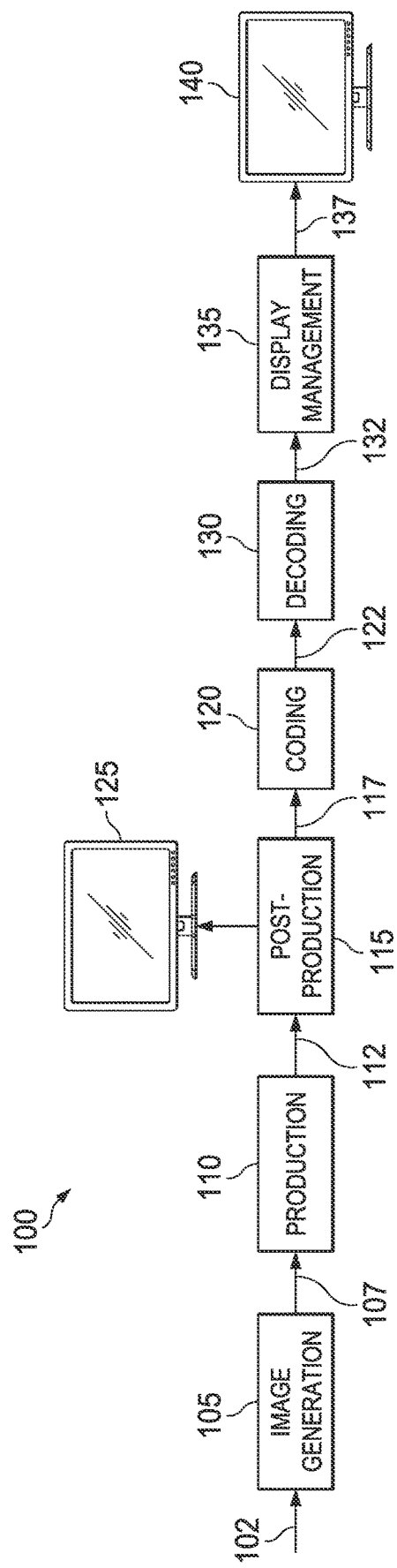
FIG. 1 depicts an example process for a video delivery pipeline.

Methods for generating and using dynamic spatial metadata in image and video processing are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

SUMMARY

Example embodiments described herein relate to methods for generating and using dynamic spatial metadata in image and video processing. In an embodiment, a processor receives an input image (202) in an input spatial resolution and an input aspect ratio. The processor:

computes (210) first metadata parameters for the input image at a first spatial resolution, wherein the first spatial resolution is equal or smaller to the input spatial resolution;

determines (205) a second spatial resolution for spatial metadata parameters, wherein the second spatial resolution is smaller than the first spatial resolution;

computes a global metadata parameter for the input image based on the first metadata parameters;

generates (220) smoothed metadata parameters by smoothing the first metadata parameters;

down-samples (225) the smoothed metadata parameters to generate the spatial metadata parameters at the second spatial resolution; and generates a metadata bitstream based on the global metadata parameter and the spatial metadata parameters.

In a second embodiment, a processor receives an input image (202) at an input spatial resolution and image metadata (232), wherein the image metadata comprise a global metadata parameter for the whole input image and encoded spatial metadata parameters for two or more regions of the input image;

generates spatial metadata parameters for the two or more regions based on the encoded spatial metadata parameters and the global metadata parameter;

receives ROI parameters defining a region of interest (ROI) image based on the input image;

generates ROI metadata based on the spatial metadata parameters and the ROI parameters;

generates an ROI image based on the input image and the ROI parameters; and performs an image processing operation on the ROI image based at least on pixel values in the ROI image and the ROI metadata.

In a third embodiment, a processor receives an input image (202) in an input spatial resolution and an input aspect ratio. The processor:

computes (210) first metadata parameters for the input image at a first spatial resolution, wherein the first spatial resolution is equal or smaller to the input spatial resolution;

determines (205) a second spatial resolution for spatial metadata parameters, wherein the second spatial resolution is smaller than the first spatial resolution;

computes a global metadata parameter for the input image based on the first metadata parameters;

generates (220) smoothed metadata parameters by smoothing the first metadata parameters;

down-samples (225) the smoothed metadata parameters to generate the spatial metadata parameters at the second spatial resolution;

receives ROI parameters defining a region of interest (ROI) image based on the input image;

generates ROI metadata based on the spatial metadata parameters and the ROI parameters;

generates an ROI image based on the input image and the ROI parameters; and performs an image processing operation on the ROI image based at least on pixel values in the ROI image and the ROI metadata.

Dynamic Spatial Metadata

Video Coding Pipeline

FIG. 1 depicts an example process of a conventional video delivery pipeline (100) showing various stages from video capture to video content display. A sequence of video frames (102) is captured or generated using image generation block (105). Video frames (102) may be digitally captured (e.g., by a digital camera) or generated by a computer (e.g., using computer animation) to provide video data (107). Alternatively, video frames (102) may be captured on film by a film camera. The film is converted to a digital format to provide video data (107). In a production phase (110), video data (107) is edited to provide a video production stream (112).

The video data of production stream (112) is then provided to a processor at block (115) for post-production editing. Block (115) post-production editing may include adjusting or modifying colors or brightness in particular areas of an image to enhance the image quality or achieve a particular appearance for the image in accordance with the video creator's creative intent. This is sometimes called "color timing" or "color grading." Other editing (e.g., scene selection and sequencing, image cropping, addition of computer-generated visual special effects, etc.) may be performed at block (115) to yield a final version (117) of the production for distribution. During post-production editing (115), video images are viewed on a reference display (125). Following post-production (115), video data of final production (117) may be delivered to encoding block (120) for delivering downstream to decoding and playback devices such as television sets, set-top boxes, movie theaters, and the like. In some embodiments, coding block (120) may include audio and video encoders, such as those defined by ATSC, DVB, DVD, Blu-Ray, and other delivery formats, to generate coded bit stream (122). In a receiver, the coded bit stream (122) is decoded by decoding unit (130) to generate a decoded signal (132) representing an identical or close approximation of signal (117). The receiver may be attached to a target display (140) which may have completely different characteristics than the reference display (125). In that case, a display management block (135) may be used to map the dynamic range of decoded signal (132) to the characteristics of the target display (140) by generating display-mapped signal (137). Without limitations, examples of display management processes are described in Refs. [1] and [2].

Elements of process 100 may also be applicable to processing still images. For example, such processing may include: capture (105), user enhancements or edits (110, 115) on the capturing device, coding (120), decoding (130), and display management on the capturing device or another playback device.

Display Mapping and Metadata

In traditional display mapping (DM), the mapping algorithm applies a sigmoid like function (for examples, see Refs [3] and [4]) to map the input dynamic range to the dynamic range of the target display. Such mapping functions may be represented as piece-wise linear or non-linear polynomials characterized by anchor points, pivots, and other polynomial parameters generated using characteristics of the input source and the target display. For example, in Refs. [3-4] the mapping functions use anchor points based on luminance characteristics (e.g., the minimum, medium (average), and maximum luminance) of the input images and the display. However, other mapping functions may use different statistical data, such as luminance-variance or luminance-standard deviation values at a block level or for the whole image. For standard dynamic range (SDR) images, the process may also be assisted by additional metadata which are either transmitted as part of the transmitted video or they are computed by the decoder or the display. For example, when the content provider has both SDR and high dynamic range (HDR) versions of the source content, a source may use both versions to generate metadata (such as piece-wise linear approximations of forward or backward reshaping functions) to assist the decoder in converting incoming SDR images to HDR images.

As used herein, the term "Level 1 (L1) metadata" denotes minimum, medium (average), and maximum luminance values related to an entire input frame or image. L1 metadata are considered dynamic metadata and may be computed by converting RGB data to a luma-chroma format (e.g., YCbCr) and then computing min, mid (average), and max values in the intensity/luma plane, or they can be computed directly in the RGB space. For example, in an embodiment, L1min denotes the minimum of the PQ-encoded (Ref. [5]) min(RGB) values of the image, while taking into consideration an active area (e.g., by excluding gray or black bars, letterbox bars, and the like). min(RGB) denotes the minimum of color component values {R, G, B} of a pixel. The values of L1mid and L1max may also be computed in a similar fashion. For example, in an embodiment, L1mid denotes the average of the PQ-encoded max(RGB) values of the image, and L1max denotes the maximum of the PQ-encoded max(RGB) values of the image. In some embodiments, L1 metadata may be normalized to be in [0, 1].

If one considers the L1Min, L1Mid, and L1Max values of the original metadata, as well as the maximum (peak) and minimum (black) luminance of a target display, denoted as Tmax and Tmin, then, as described in Ref. [3-4], one may generate an intensity tone-mapping curve mapping the intensity of the input image to the dynamic range of the target display. Such mapping will work quite well when mapping the whole image to the display, but may yield unexpected results when the input image is cropped or zoomed before being displayed, since luminance information on the selected part of the image may be quite different from luminance information for the whole image. As appreciated by the inventors, image processing, such as tone-mapping of cropped or zoomed regions, to also be referred as regions of interest (ROI), may be improved by using local-area-based metadata, or spatial metadata.

As used herein, the term "spatial metadata" denotes image metadata representative of spatial-pixel information in sub-regions of an image. For example, given an input image subdivided into M×N non-overlapping rectangular blocks, L1 spatial metadata may comprise min, mid, and max luminance values in each one of these M×N blocks. In other embodiments, an image could be segmented into objects, and each such object would be associated with its own spatial metadata. As appreciated by the inventors, to avoid image artifacts or diminishing the user experience, spatial metadata may be characterized by the following properties:

- Represent an "envelope" of the global metadata (that is, metadata that encompasses the min and max in the surrounding local region)
- Be smooth to allow for smooth transitions when a user interacts with neighboring parts of an image region under observation
- Be automatically generated
- Don't add excessive computation load during content creation Without loss of generality, an example process for generating L1 spatial metadata is presented next.

Generating Spatial Metadata

Consider an input image of width×height spatial resolution. One may use the whole image to generate global and spatial metadata, or, due to limited computational resources, one may decide to generate global and spatial metadata based on a subset of the input image. In an embodiment, without limitation, the aspect ratio of the resolution of the spatial metadata may match the aspect ratio of the image data used to generate the global metadata.

Note: in the remaining discussion, without loss of generality, specific computational examples may be given in pseudo-code or in MATLAB code.

Step 1: Determine Dimensions of Metadata from the Image Dimensions.

In this example one may determine to fix the longer image dimension (length or width) of the spatial metadata to have M (e.g., M=16) samples. Then, the other dimension (N) may be derived with a matching aspect ratio. In this example, the full image is being used. For example, for M=16:

```
% Size of metadata
    DesiredMDsz = 16;   // Width (M) of an M x N metadata
array
    % Adapt metadata to match aspect ratio of image
    sz = size(im);   // [height width] of input image im
    if sz(1)<sz(2)
        MDsz(2) = DesiredMDsz;
        MDsz(1) = round(DesiredMDsz * sz(1)/sz(2));
    else
        MDsz(1) = DesiredMDsz;
        MDsz(2) = round(DesiredMDsz * sz(2)/sz(1));
    end
```

Note: in MATLAB, size(im) returns the width and height of an image im as a vector [height width]. Thus, sz(1)=size(im) and sz(2)=size(im) specify the height and the width. round (x) rounds x to the nearest integer.

At the end of Step 1, vector MDsz specifies the size of an M×N array of spatial metadata. If these metadata represent L1 metadata (e.g., min. mid, max luminance values), then, as an example, Steps 2-3 below compute the corresponding min and max values in the RGB domain. Similar steps could be applied to compute the L1 metadata in a luma-chroma domain, or to compute other dynamic spatial metadata values.

Step 2: Compute Min(RGB) and Max(RGB)

```
% min and max channels
    maxRGB = max(im,[ ],3);
    minRGB = min(im,[ ],3);
```

Step 3: Compute Global (Full Frame) Metadata

```
% global L1 metadata
    globalMD = [min(minRGB(:)) mean(maxRGB(:))
max(maxRGB(:))];
```

Step 4: Dilate and Erode the Minimum and Maximum Values.

This can also be referred to as a windowed maximum and windowed minimum. The radius of the dilation filter (R) is calculated from the ratio of the image size to the spatial metadata size multiplied by some factor (e.g., in this case, 2). In the example below, a rectangular filter is used; however, other shapes such as circles are also possible. This is a pre-processing step to improve upon a smoothing operation of the metadata to follow in the next step.

```
% Dilate the min and max
    R = ceil([szD(1)/MDsz(1) szD(2)/MDsz(2)]*2);
    H1 = ones(R*2+1);   // Create an array of all ones
    maxRGB_max = imdilate(maxRGB, H1);
    minRGB_min = imerode(minRGB, H1);
    maxRGB_avg = maxRGB;
```

Notes: y=ceil(x) rounds each element of x to the nearest integer greater than or equal to that element. J=imdilate(I, nhood) dilates the image I, where nhood is a matrix of 0 s and 1 s that specifies the structuring element neighborhood. J=imerode(I,nhood) erodes the image I, where nhood is a matrix of 0 s and 1 s that specifies the structuring element neighborhood. The dilation and erosion steps help preserve the local maximum, which may be lost with the filtering step alone.

Stage 5: Smooth the Min and Max.

This step ensures that as a cropped region changes smoothly, the metadata also changes smoothly. This prevents sudden jarring changes across boundaries. In an embodiment, the radius of the spatial filter is half of the radius used in the previous step, to ensure that the local min/max is not changed. In this example, a 2D Gaussian filter is used.

```
% Spatial filtering
R = ceil([szD(1)/MDsz(1) szD(2)/MDsz(2)]);
H2y = exp( -linspace(-3,3,R(1)*2+1).^2 / 2 );
H2x = exp( -linspace(-3,3,R(2)*2+1).^2 / 2 );
H2y = H2y/sum(H2y);
H2x = H2x/sum(H2x);
maxRGB_max = padarray(maxRGB_max,R,max(maxRGB(:)),'both');
minRGB_min = padarray(minRGB_min,R,min(minRGB(:)),'both');
maxRGB_avg =
padarray(maxRGB_avg,R,mean(maxRGB(:)),'both');
maxRGB_max = conv2(H2y',H2x,maxRGB_max,'valid');
minRGB_min = conv2(H2y',H2x,minRGB_min,'valid');
maxRGB_avg = conv2(H2y',H2x,maxRGB_avg,'valid');
```

Notes: y=linspace(x1,x2) returns a row vector of 100 evenly spaced points between x1 and x2. B=padarray(A,padsize, padval) pads array A, where padval specifies a constant value to use for padded elements or a method to replicate array elements. When padval is 'both,' then it pads before the first element and after the last array element along each dimension. C=conv2(A,B, 'valid') returns the two-dimensional convolution of matrices A and B. 'valid' specifies to return only parts of the convolution that are computed without zero-padded edges.

Stage 6: Down-Sample the Filtered Image to Desired Metadata Resolution

```
% Downsample
maxRGB_max_md = imresize(maxRGB_max,MDsz,'bilinear');
minRGB_min_md = imresize(minRGB_min,MDsz,'bilinear');
maxRGB_avg_md = imresize(maxRGB_avg,MDsz,'bilinear');
```

Notes: B=imresize(A, scale, method) returns image B that is scale times the size of image A. The input image A can be a grayscale, RGB, binary, or categorical image. If A has more than two dimensions, then imresize only resizes the first two dimensions. If scale is between 0 and 1, then B is smaller than A. If scale is greater than 1, then B is larger than A. By default, imresize uses bicubic interpolation. In this example embodiment, resizing is performed via a bilinear interpolation method due to its simplicity; however, other interpolation schemes may be applied as well.

Given the spatial metadata of Step 6, there are many alternatives to pack them and transmit them as part of the image data. In an embodiment, L1 spatial metadata may be transmitted as offset values from the global L1 metadata. For example, in an embodiment, one may transmit global and spatial L1 metadata as follows:

```
%Level 1: (12 bit unsigned values, range 0 to 1)
L1Min;
L1Mid;
L1Max;
%Level 1Spatial: (signed values , range –0.5 to 0.5)
SpatialMD1 : [M N]; // indicates spatial resolution of the metadata
for (i = 0, i < M, i++)
   for (j = 0, j < N, j++)
{
```

-continued

```
SpatialMinOffset [i][j] : L1Min – SpatialMin[i][j];
SpatialMidOffset [i][j]: L1Mid – SpatialMid[i][j];
SpatialMaxOffset [i][j]: L1Max – SpatialMax[i][j];
}
```

Alternatively, one could transmit the spatial metadata on their own, without reference to any global metadata. In some embodiments metadata may also be transmitted using any known in the art lossless coding schemes.

Assuming a differential coding scheme, the offset values may be computed as in Stage 7.

Stage 7: Compute Offset from Global Metadata

```
maxRGB_max_md_offset = globalMD(3) – maxRGB_max_md;
minRGB_min_md_offset = globalMD(1) – minRGB_min_MD;
maxRGB_avg_md_offset = globalMD(2) – maxRGB_avg_md;
```

Figure 2A:
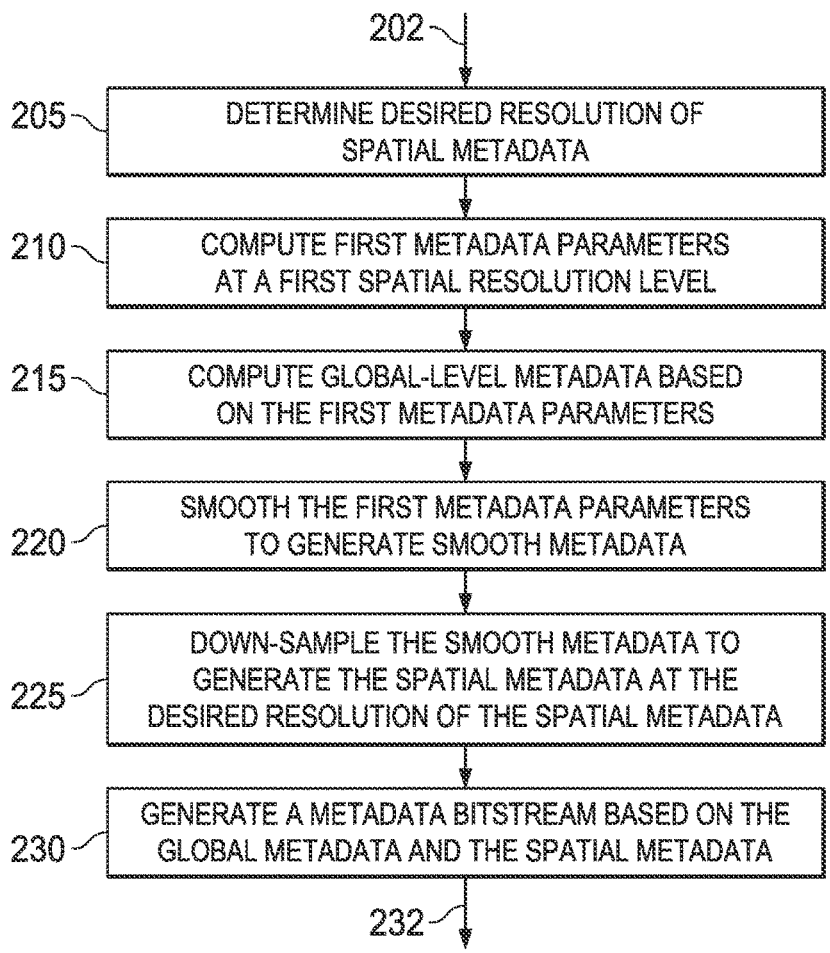
FIG. 2A depicts an example process for generating spatial metadata according to an embodiment of the present invention.

FIG. 2A depicts an example process of Steps 1-7 to generate spatial metadata.

As depicted in FIG. 2A, given an input image 202, step 205 determines the resolution of the spatial metadata (e.g., M×N). In step 210, metadata parameters may be computed at a first spatial resolution, representing the highest possible resolution of available values. For example, for L1 metadata, parameters for min, mid, and max luminance values can be computed at the full-resolution pixel level. In step 215, one may use the results of step 210 to compute the global metadata for the whole image. In step 220, one may need to preprocess and smooth the metadata generated at the first spatial resolution to generate smooth metadata. As shown earlier, smoothing may involve a variety of operations, like dilation, erosion, and spatial filtering. In step 225, the smoothed metadata are down-sampled to generate the spatial metadata at the desired resolution of the spatial metadata. Finally, in step 230, both the global and the corresponding spatial metadata are packed together (232) in an appropriate file format to be transmitted downstream, together with the image data. For example, spatial metadata may be transmitted as offsets of the global metadata.

In an embodiment, spatial metadata may also be computed at an "object" level. For example, an image could be segmented into two or more arbitrarily shaped objects (overlapping or non-overlapping). Then, after smoothing the image-level metadata parameters (step 220), an encoder could generate spatial metadata parameters for each object by a corresponding segmentation of the image-level metadata parameters. In step 230, for packing the metadata, a metadata format may include the number of available objects, a label for each object, and the corresponding metadata parameters for each object.

Reconstructing and Applying Spatial Metadata

Figure 2B:
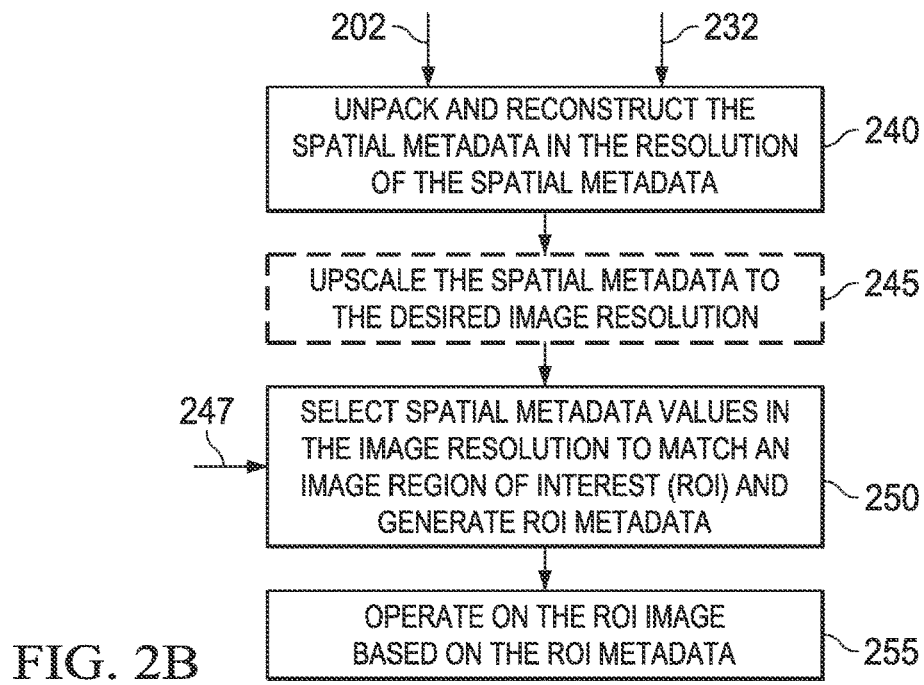
FIG. 2B depicts an example process for extracting and applying spatial metadata according to an embodiment of the present invention.

Given an image (202) with both global metadata and coded spatial metadata (232), FIG. 2B depicts an example process to reconstruct the metadata and apply them to image processing applications, such as display mapping. For example, assuming the encoder transmitted the spatial metadata as offset values to the global metadata, in step 240, the actual spatial L1 metadata values can be reconstructed as:

```
for (i = 0, i < M, i++)
   for (j = 0, j < N, j++)
{
   SpatialMin [i][j] : L1Min – SpatialMinOffset[i][j];
```

```
SpatialMid[i][j]: L1Mid − SpatialMidOffset[i][j];
SpatialMax[i][j]: L1Max − SpatialMaxOffset[i][j];
}
```

In MATLAB, this can be expressed as:
Stage 1: Add Offset of Global Metadata

```
maxRGB_max_md = globalMD(3) − maxRGB_max_md_offset;
minRGB_min_md = globalMD(1) − minRGB_min_md_offset;
maxRGB_avg_md = globalMD(2) − maxRGB_avg_md_offset;
```

Next, in step 245, the M×N metadata may be up-scaled to the desired resolution, for example, at the same resolution as the input image. For example:
Stage 2: Up-Sample Metadata to Image Resolution

```
% Upsample
maxRGB_max = imresize(maxRGB_max_md,sz(1:2),'bilinear');
minRGB_min = imresize(minRGB_min_md,sz(1:2),'bilinear');
maxRGB_avg = imresize(maxRGB_avg_md,sz(1:2),'bilinear');
```

Next, given a region of interest in the input image (202), as specified by ROI image parameters (247), step 250 selects the appropriate spatial metadata for that region. For example, if the application performs display mapping of a region of interest (say, a region generated by cropping, zooming, and the like), then in an embodiment, the spatial metadata generated for the whole image in step 245, may be cropped, zoomed, etc., to match the region of interest. Note that the ROI may be rectangular, circular, elliptical, or arbitrary, based on user control or other means of the application. Then, ROI image parameters 247 may define suitable parameters for a circle, a rectangle, a polygon, and the like, defining the area of interest and its resolution. For example, for a rectangular ROI:
Stage 3: Select metadata to match selected region of interest in the image to be displayed

```
% Apply crop and compute metadata
kx = min(sz(2),(roi(1):roi(2)));
ky = min(sz(1),(roi(3):roi(4)));
mdMinCrop = minRGB_min( ky, kx);
mdMidCrop = maxRGB_avg( ky, kx);
mdMaxCrop = maxRGB_max( ky, kx);
cropmd = [min(mdMinCrop(:)) mean(mdMidCrop(:))
max(mdMaxCrop(:))];
``` where, the roi( ) function returns coordinates of the ROI, image, and cropmd denotes a vector with min, mid, and max luminance values within the selected ROI image. In such an embodiment, it is expected that a corresponding cropped image region will also be generated.

Figure 3:
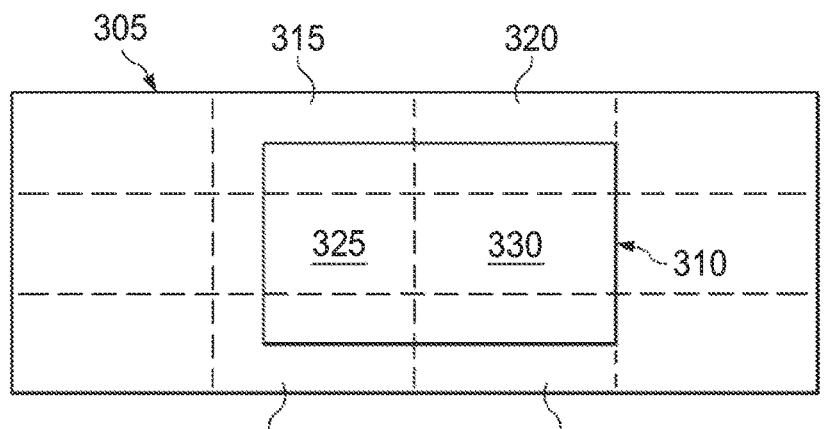
FIG. 3 depicts an example image, a region of interest, and associated spatial metadata regions in the image according to an embodiment of the present invention.

In some embodiments, step 245 may be skipped by modifying step 250, thus reducing the computational load. For example, in step 250, one may
 a) Compute interpolated values for all edges of the region of interest in the low resolution spatial metadata, based on the distance between the edge of the ROI to adjacent spatial metadata values
 b) Compute the ROI metadata based on the interpolated metadata values (e.g., max, min, mean) of the edge values as well as all metadata values that are completely inside the region of interest As an example, consider FIG. 3, depicting an image 305, subdivided into 4×3 spatial metadata regions. Consider ROI image 310, specified withing spatial metadata regions 315, 320, 325, 330, 335, and 340. The ROI metadata can be computed based on interpolated metadata across all edge points of the ROI (310), and the spatial metadata of metadata region 330. For example, to compute metadata across the top edge of ROI 310, one would interpolate among the local metadata values in regions 315 and 325, and regions 320 and 330.

Returning to FIG. 2B, given a region of interest and the corresponding spatial metadata for that region, next, in step 255, an image processor may operate on the selected region using information from its corresponding spatial metadata. For example, a display mapping process (see Refs. [1-4]) may use the target display characteristics and the ROI metadata to tone-map the ROI to the target display.

In some embodiments, spatial metadata values may be further scaled or, in general, transformed before being applied to an imaging operation (say, tone mapping, contrast enhancement, and the like) in the region of interest. For example, consider an image captured by a device with a 1,000 nits display (say, a mobile phone with Dolby Vision®). Let the captured image include a very bright light source (say, the sun or a window with bright sky) and other items of less brightness (say, clouds, curtains, a person, etc.). On the encoder, the image capture device will map the brightest source to 1,000 nits and may adjust the next brightest item (say, a cloud) to a suitable brightness, say 200 nits, to match the typical very high ratio of brightness between the two objects. If one displays the whole image on a similar device at 1,000 nits (say, on a similar phone), then because the reference and target displays have identical dynamic range, under normal display mapping processes, there would be no dynamic range conversion, and all image components will be displayed as captured; however, if a user on the second device decides to crop the brightest source, it may be beneficial to use the spatial metadata to remap all other items in the image to take full advantage of the HDR display. For example, even if the L1 spatial metadata for the cloud area specify that the local max luminance to be 200 nits, a decoder may decide to multiply it by a scale factor, say 2 or 4, to map it to the display at 400 nits or 800 nits, thus improving the user experience. These scaling factors may be determined via a user interface on the display device, by the tone-mapping algorithm, or they may be part of the image metadata as additional metadata, say, a look-up table associating each object in the image or each M×N sub-region with a weight or scaler.

In general, when cropping or zooming on images, a user may use rather crude interfaces (say their finger), and the region of interest, say a person's face, may include neighboring areas where the local, spatial, metadata, may skew the parameters needed for proper display mapping. Additionally, as mentioned before, by removing cropped-out regions, there might be more dynamic range room to expand the dynamic range of the cropped or zoomed region. In such a scenario, the decoder may derive a "differential metric" by comparing the difference of the extracted local metadata to the global metadata and use that metric to assign to spatial metadata values of a certain region more weight than the values generated by steps 245 and 250 described earlier. These weights or scaling values may also be part of the image metadata as a lookup-table, so that each captured image (or scene in a video) has its own local optimization. Alternatively, these scaling factors or weights can be computed by the decoder on the fly based on the global metadata values and the ROI metadata values. Considering the usefulness of such scaling, for example, the reconstruction Step 1 above may be rewritten as $$maxRGB\_max\_md = globalMD(3) - maxRGB\_max\_md\_offset*SpMaxOffscaler;$$
$$minRGB\_min\_md = globalMD(1) - minRGB\_min\_md\_offset*SpMinOffscaler;$$
$$maxRGB\_avg\_md = globalMD(2) - maxRGB\_avg\_md\_offset*SpAvgOffscaler;$$

where the SpMaxOffscaler, SpMinOffscaler, and SpMidOffscaler denote scaler values larger than 0 that can be determined based on a calibration step, user menus, the display viewing mode (say, normal, vivid, movie, etc.), or other application parameters.

Figure 2C:
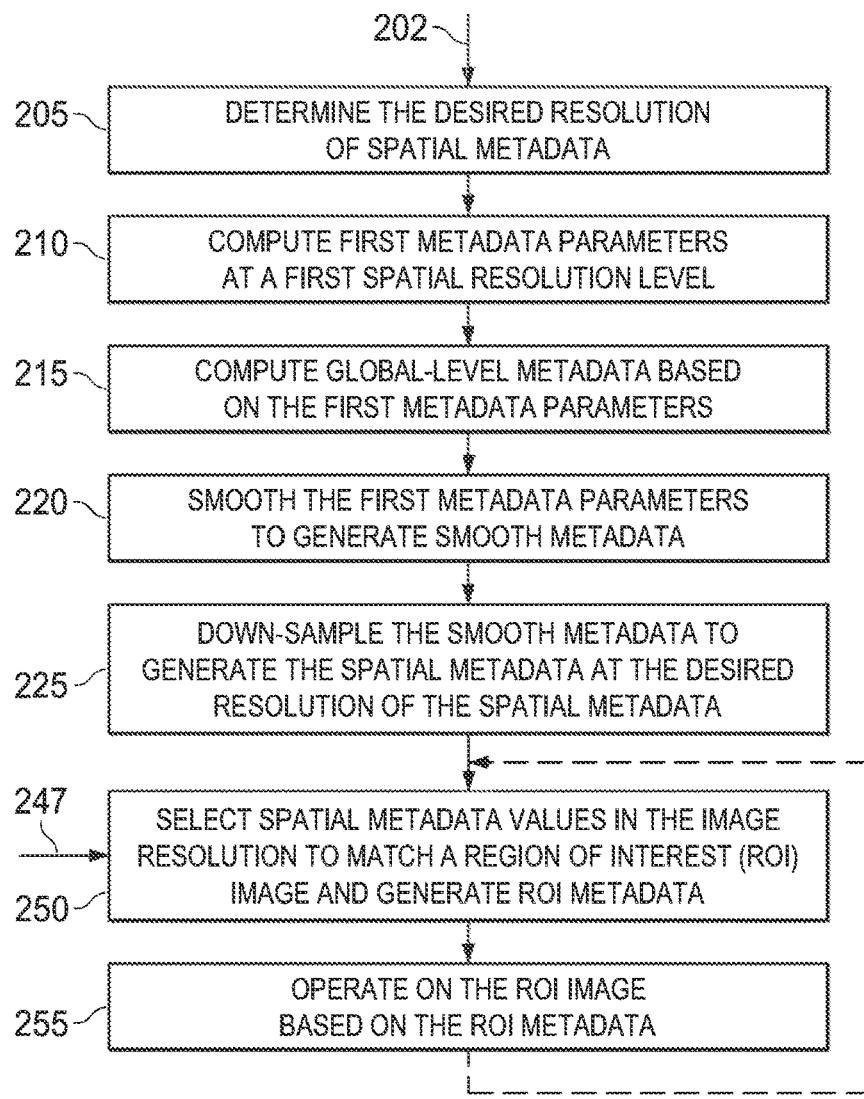
FIG. 2C depicts an example process for generating and applying spatial metadata according to an embodiment of the present invention.

In an embodiment, a decoder (or playback) device may be both the creator and consumer of spatial metadata. For example, a user may capture an image on their phone or camera and then try to display it using crop or zoom operations. Alternatively, a user may receive an image without spatial metadata, but they would like to view only parts of the image. In such a scenario, when the full-size image is loaded, the device may generate both global and full-size spatial metadata. Then, as the image is zoomed, cropped, resized, and the like, given an ROI image, the display mapping function will a) select the appropriate ROI metadata from the full-size spatial metadata and b) apply tone-mapping or other image-processing functions (e.g., contrast enhancement, and the like) using the selected ROI metadata. This has the advantage that the full-image metadata are computed only once and ROI metadata can be updated quickly without further analyzing the ROI image of interest. An example such process, which combines processing steps discussed in FIG. 2A and FIG. 2B, is depicted in FIG. 2C. As depicted in FIG. 2C, processing steps 205 to 225 will be computed only once, but steps 250 and 255 may be computed every time the ROI parameters (247) change.

A number of embodiments of the disclosure have been described. Nevertheless, it will be understood that various modifications may be made without departing from the spirit and scope of the present disclosure. Accordingly, the invention may be embodied in any of the forms described herein, including, but not limited to the following Enumerated Example Embodiments (EEEs) which described structure, features, and functionality of some portions of the present invention:

EEE1. A method for processing spatial metadata with a processor, the method comprising:
  accessing an input image (202) in an input spatial resolution and an input aspect ratio;
  computing (210) first metadata parameters for the input image at a first spatial resolution, wherein the first spatial resolution is equal or smaller to the input spatial resolution;
  determining (205) a second spatial resolution for spatial metadata parameters, wherein the second spatial resolution is smaller than the first spatial resolution;
  computing a global metadata parameter for the input image based on the first metadata parameters;
  generating (220) smoothed metadata parameters by smoothing the first metadata parameters; and
  down-sampling (225) the smoothed metadata parameters to generate the spatial metadata parameters at the second spatial resolution.
EEE2. The method of EEE1, further comprising:
  receiving ROI parameters defining a region of interest (ROI) image based on the input image;
  generating ROI metadata based on the spatial metadata parameters and the ROI parameters;
  generating an ROI image based on the input image and the ROI parameters; and
  performing an image processing operation on the ROI image based at least on pixel values in the ROI image and the ROI metadata.
EEE3. The method of EEE1 or EEE2, further comprising generating a metadata bitstream based on the global metadata parameter and the spatial metadata parameters.
EEE4. The method of any one of EEE1 to EEE3, wherein the second spatial resolution and the first spatial resolution have identical aspect ratios.
EEE5. The method of any one of EEE1 to EEE4, where smoothing the first metadata parameters comprises:
  applying a dilation filter to the first metadata parameters to generate dilated metadata parameters;
  applying an erosion filter to the dilated metadata parameters to generate erosion metadata parameters; and
  applying a 2D spatial filter to the erosion metadata parameters to generate the smoothed metadata parameters.
EEE6. The method of EEE5, wherein the 2D spatial filter comprises a 2D Gaussian filter.
EEE7. The method of any one of EEE3 to EEE6, wherein generating the metadata bitstream comprises:
  computing metadata offsets between the spatial metadata parameters and the global metadata parameter; and
  generating the metadata bitstream based on the global metadata parameter and the metadata offsets.
EEE8. A method to process an image comprising spatial metadata, the method comprising:
  receiving an input image (202) at an input spatial resolution and image metadata (232), wherein the image metadata comprise a global metadata parameter for the entire input image and encoded spatial metadata parameters for two or more regions of the input image;
  generating spatial metadata parameters for the two or more regions based on the encoded spatial metadata parameters and the global metadata parameter;
  receiving ROI parameters defining a region of interest (ROI) image based on the input image;
  generating ROI metadata based on the spatial metadata parameters and the ROI parameters;
  generating an ROI image based on the input image and the ROI parameters; and
  performing an image processing operation on the ROI image based at least on pixel values in the ROI image and the ROI metadata.
EEE9. The method of EEE8, wherein the encoded spatial metadata parameters comprise difference values between the global metadata parameter and the spatial metadata parameters.
EEE10. The method of EEE9, wherein generating the spatial metadata parameters comprises subtracting from the global metadata parameter the difference values.
EEE11. The method of any one of EEE2 to EEE10, wherein generating the ROI metadata based on the spatial metadata parameters and the ROI parameters comprises:
  upscaling the spatial metadata parameters from a spatial metadata resolution to a third spatial resolution to generate upscaled metadata; and
  extracting from the upscaled metadata the ROI metadata based on the ROI parameters.

EEE12. The method of any one of EEE2 to EEE10, wherein generating the ROI metadata based on the spatial metadata parameters and the ROI parameters comprises:
generating edge-spatial metadata parameters by interpolating between spatial metadata parameters in regions bracketing edges of the ROI image; and
generating the ROI metadata based on the edge-spatial metadata parameters and spatial metadata parameters associated with regions within the ROI image.

EEE13. The method of any one of EEE2 to EEE12, wherein the image processing operation comprises a tone mapping operation of the ROI image to a target display.

EEE14. The method of any one of EEE2 to EEE13, wherein before applying the ROI metadata to the image processing operation, further comprising scaling an ROI metadata parameter among the ROI metadata by a scaling factor.

EEE15. The method of EEE14, wherein the scaling factor is based on a difference between the ROI metadata parameter and the global metadata parameter.

EEE16. The method of one of EEEs 1-15, wherein the global metadata parameter comprises one of a maximum, an average, or a minimum luminance value for the input image.

EEE17. The method of one of EEEs 1-15, wherein the spatial metadata parameters are generated for M×N non-overlapping regions of the input image, wherein M and N are integers, and M×N denotes the second spatial resolution.

EEE18. An apparatus comprising a processor and configured to perform any one of the methods recited in EEEs 1-17.

EEE19. A non-transitory computer-readable storage medium having stored thereon computer-executable instruction for executing a method with one or more processors in accordance with any one of the EEEs 1-17.

REFERENCES

Each one of the references listed herein is incorporated by reference in its entirety.
1. U.S. Pat. No. 9,961,237, *"Display management for high dynamic range video,"* by R. Atkins.
2. PCT Application PCT/US2020/028552, filed on 16 Apr. 2020, WIPO Publication WO/2020/219341, *"Display management for high dynamic range images,"* by R. Atkins et al.
3. U.S. Pat. No. 8,593,480, *"Method and apparatus for image data transformation,"* by A. Ballestad and A. Kostin,
4. U.S. Pat. No. 10,600,166, *"Tone curve mapping for high dynamic range images,"* by J. A. Pytlarz and R. Atkins.
5. Rec. ITU-R BT-2100-2, *"Image parameter values for high dynamic range television for use in production and international programme exchange,"* ITU, 07/2018.

EXAMPLE COMPUTER SYSTEM IMPLEMENTATION

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions related to image operations, such as those described herein. The computer and/or IC may compute any of a variety of parameters or values that relate to dynamic spatial metadata for images as described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to dynamic spatial metadata for images as described above by executing software instructions in a program memory accessible to the processors. The invention may also be provided in the form of a program product. The program product may comprise any tangible and non-transitory medium which carries a set of computer-readable signals comprising instructions which, when executed by a data processor, cause the data processor to execute a method of the invention. Program products according to the invention may be in any of a wide variety of tangible forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to dynamic spatial metadata for images are thus described. In the foregoing specification, embodiments of the present invention have been described with reference to numerous specific details that may vary from implementation to implementation. Thus, the sole and exclusive indicator of what is the invention, and what is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:
1. A method for processing spatial metadata with a processor, the method comprising:
accessing an input image (202) in an input spatial resolution and an input aspect ratio;

computing (210) first metadata parameters for the input image at a first spatial resolution, wherein the first spatial resolution is equal or smaller to the input spatial resolution;

determining (205) a second spatial resolution for spatial metadata parameters, wherein the second spatial resolution is smaller than the first spatial resolution;

computing a global metadata parameter for the input image based on the first metadata parameters, wherein the global metadata parameter is representative of pixel values over the whole input image;

generating (220) smoothed metadata parameters by smoothing the first metadata parameters; and down-sampling (225) the smoothed metadata parameters to generate the spatial metadata parameters at the second spatial resolution, wherein the spatial metadata parameters are representative of pixel values in sub-regions of the input image.

2. The method of claim 1, further comprising:

receiving ROI parameters defining a region of interest (ROI) image based on the input image;

generating ROI metadata based on the spatial metadata parameters and the ROI parameters;

generating an ROI image based on the input image and the ROI parameters; and performing an image processing operation on the ROI image based at least on pixel values in the ROI image and the ROI metadata.

3. The method of claim 1, further comprising generating a metadata bitstream based on the global metadata parameter and the spatial metadata parameters.

4. The method of claim 1, wherein the second spatial resolution and the first spatial resolution have identical aspect ratios.

5. The method of claim 1, where smoothing the first metadata parameters comprises:

applying a dilation filter to the first metadata parameters to generate dilated metadata parameters;

applying an erosion filter to the dilated metadata parameters to generate erosion metadata parameters; and applying a 2D spatial filter to the erosion metadata parameters to generate the smoothed metadata parameters.

6. The method of claim 5, wherein the 2D spatial filter comprises a 2D Gaussian filter.

7. The method of claim 3, wherein generating the metadata bitstream comprises:

computing metadata offsets between the spatial metadata parameters and the global metadata parameter; and generating the metadata bitstream based on the global metadata parameter and the metadata offsets.

8. A method to process an image comprising spatial metadata, the method comprising:

receiving an input image (202) at an input spatial resolution and image metadata (232), wherein the image metadata comprise a global metadata parameter for the entire input image, wherein the global metadata parameter is representative of pixel values over the whole input image, and encoded spatial metadata parameters for two or more regions of the input image;

generating spatial metadata parameters for the two or more regions based on the encoded spatial metadata parameters and the global metadata parameter, wherein the spatial metadata parameters are representative of pixel values in sub-regions of the input image;

receiving ROI parameters defining a region of interest (ROI) image based on the input image;

generating ROI metadata based on the spatial metadata parameters and the ROI parameters;

generating an ROI image based on the input image and the ROI parameters; and performing an image processing operation on the ROI image based at least on pixel values in the ROI image and the ROI metadata.

9. The method of claim 8, wherein the encoded spatial metadata parameters comprise difference values between the global metadata parameter and the spatial metadata parameters.

10. The method of claim 9, wherein generating the spatial metadata parameters comprises subtracting from the global metadata parameter the difference values.

11. The method of claim 2, wherein generating the ROI metadata based on the spatial metadata parameters and the ROI parameters comprises:

upscaling the spatial metadata parameters from a spatial metadata resolution to a third spatial resolution to generate upscaled metadata; and extracting from the upscaled metadata the ROI metadata based on the ROI parameters.

12. The method of claim 2, wherein generating the ROI metadata based on the spatial metadata parameters and the ROI parameters comprises:

generating edge-spatial metadata parameters by interpolating between spatial metadata parameters in regions bracketing edges of the ROI image; and generating the ROI metadata based on the edge-spatial metadata parameters and spatial metadata parameters associated with regions within the ROI image.

13. The method of claim 2, wherein the image processing operation comprises a tone mapping operation of the ROI image to a target display.

14. The method of claim 2, wherein before applying the ROI metadata to the image processing operation, further comprising scaling an ROI metadata parameter among the ROI metadata by a scaling factor.

15. The method of claim 14, wherein the scaling factor is based on a difference between the ROI metadata parameter and the global metadata parameter.

16. The method of claim 1, wherein the spatial metadata parameters are representative of minimum, average and maximum luminance values in sub-regions of the input image (202, 305).

17. The method of claim 1, wherein the spatial metadata parameters are representative of minimum, average and maximum color component values in sub-regions of the input image (202, 305).

18. An apparatus comprising a processor and configured to perform the method recited in claim 1.

19. A non-transitory computer-readable storage medium having stored thereon computer-executable instruction for executing a method with one or more processors in accordance with claim 1.

20. The method of claim 1, wherein the global metadata parameter is representative of minimum, average, and maximum luminance values over the whole input image.

* * * * *